US012311512B2

(12) United States Patent
Langhorst et al.

(10) Patent No.: US 12,311,512 B2
(45) Date of Patent: May 27, 2025

(54) SCREWING DEVICE, DRIVING TORQUE GENERATING MEANS, SCREWING SYSTEM AND TORQUE CONTROL METHOD

(71) Applicant: Johannes Lübbering GmbH, Herzebrock-Clarholz (DE)

(72) Inventors: Thomas Langhorst, Harsewinkel (DE); Bruno Bergmann, Gütersloh (DE); Achim Lübbering, Herzebrock-Clarholz (DE)

(73) Assignee: Johannes Lübbering GmbH, Herzebrock-Clarholz (DE)

(*) Notice: Subject to any disclaimer, the term of this patent is extended or adjusted under 35 U.S.C. 154(b) by 828 days.

(21) Appl. No.: 17/264,473

(22) PCT Filed: Jul. 23, 2019

(86) PCT No.: PCT/EP2019/069841
§ 371 (c)(1),
(2) Date: Jan. 29, 2021

(87) PCT Pub. No.: WO2020/025402
PCT Pub. Date: Feb. 6, 2020

(65) Prior Publication Data

US 2021/0316427 A1 Oct. 14, 2021

(30) Foreign Application Priority Data

Aug. 2, 2018 (DE) ..................... 10 2018 118 853.6

(51) Int. Cl.
*B25B 23/147* (2006.01)
*B25B 21/00* (2006.01)

(52) U.S. Cl.
CPC .......... *B25B 23/147* (2013.01); *B25B 21/002* (2013.01)

(58) Field of Classification Search
CPC ............ B25B 23/1425; B25B 23/1422; B25B 23/147; B25B 23/1475; B25B 17/02;
(Continued)

(56) References Cited

U.S. PATENT DOCUMENTS

| | | | |
|---|---|---|---|
| 3,965,778 A * | 6/1976 | Aspers | B25B 21/002 73/761 |
| 4,106,570 A | 8/1978 | Eshghy et al. | |

(Continued)

FOREIGN PATENT DOCUMENTS

| | | |
|---|---|---|
| CN | 104412090 A | 3/2015 |
| CN | 107530870 A | 1/2018 |

(Continued)

OTHER PUBLICATIONS

International search report for patent application No. PCT/EP2019/069841 dated Dec. 19, 2019.

*Primary Examiner* — Stephen F. Gerrity
*Assistant Examiner* — Linda J Hodge
(74) *Attorney, Agent, or Firm* — Bachman & LaPointe, P.C.

(57) ABSTRACT

A screwing device for applying and/or transmitting a torque to a screw partner and for interacting with a drive torque generating means, including flat output means (6) which have an output that, can be detachably connected to the screw partner and a drive, to which a drive torque can be manually or mechanically applied, an output gearwheel (8) that can be driven by the fiat output means (6), a mechanical interface (46) for selective direct or indirect connection to the drive torque generating means for initiating the torque, a compensation unit (30) which is designed to store and process compensation data and which comprises an output gearwheel-specific torque curve and/or an output gearwheel-specific efficiency curve for calculating it with a value of an actual output torque in order to generate a value of a (Continued)

compensated output torque, and a data interface (36) which is designed to transmit compensation data to a drive torque generating means.

15 Claims, 7 Drawing Sheets

(58) Field of Classification Search
CPC ......... B25B 17/00; B25B 13/04; B25B 13/08; B25B 21/002; B25B 13/481; B25F 5/00
USPC .................................................. 173/181, 183
See application file for complete search history.

(56) References Cited

U.S. PATENT DOCUMENTS

| | | | | | |
|---|---|---|---|---|---|
| 4,244,245 | A * | 1/1981 | Wallace | B25B 23/14 173/180 |
| 4,506,567 | A * | 3/1985 | Makhlouf | B25B 13/107 81/57.3 |
| 5,816,121 | A * | 10/1998 | Yoshimizu | B25B 23/1415 173/217 |
| 2006/0218768 | A1 | 10/2006 | Fujii et al. | |
| 2009/0205848 | A1 | 8/2009 | Wilson, Jr. et al. | |
| 2010/0265097 | A1 | 10/2010 | Obatake et al. | |
| 2010/0269646 | A1 | 10/2010 | Le Du et al. | |
| 2012/0312132 | A1* | 12/2012 | Li | B25B 23/1425 81/479 |
| 2014/0331828 | A1 | 11/2014 | King et al. | |
| 2015/0122522 | A1* | 5/2015 | Fujimoto | B25B 21/00 173/1 |
| 2018/0117746 | A1* | 5/2018 | Forsberg | B25B 21/00 |
| 2019/0039215 | A1 | 2/2019 | Barzelay | |
| 2021/0276163 | A1* | 9/2021 | Eriksson | B25B 21/007 |

FOREIGN PATENT DOCUMENTS

| | | | | |
|---|---|---|---|---|
| DE | 3212038 A1 | 11/1982 | |
| DE | 19619324 A1 * | 4/1997 | F02D 11/105 |
| DE | 202006016830 U1 | 1/2007 | |
| DE | 102007019409 B3 | 11/2008 | |
| DE | 602006000330 T2 | 12/2008 | |
| DE | 202010006554 U1 | 8/2010 | |
| DE | 102010019792 A1 | 11/2011 | |
| DE | 102010023798 A1 | 12/2011 | |
| EP | 2177322 B1 | 5/2014 | |
| GB | 2033089 A * | 5/1980 | B25B 23/14 |
| GB | 2096361 A | 10/1982 | |
| IE | 20120251 A1 | 12/2013 | |
| JP | S6399180 A | 4/1988 | |
| JP | H0929655 A | 2/1997 | |
| RU | 2238183 C2 | 10/2004 | |
| RU | 2009142992 C2 | 5/2011 | |
| SU | 841950 A1 | 6/1981 | |
| SU | 1388272 A1 | 4/1988 | |
| WO | 2014062149 A1 | 4/2014 | |
| WO | 2016/156388 A1 | 10/2016 | |
| WO | 2019/027788 A2 | 2/2019 | |

* cited by examiner

SCREWING DEVICE, DRIVING TORQUE GENERATING MEANS, SCREWING SYSTEM AND TORQUE CONTROL METHOD

BACKGROUND OF THE INVENTION

The present invention relates to a screwing device for applying a torque to a screw partner. Additionally, the invention relates to a drive torque generating means for generating a torque. Furthermore, the present invention relates to a screwing system at least comprising a screwing device and a drive torque generating means. The present invention also relates to a method for controlling a drive motor of a screwing system. Additionally, the invention relates to the use of a screwing system for performing the method.

From practice, in particular the industrial screwing technology, screwing devices are known which are referred to as so-called geared offset heads and are used in particular in screwing and assembly work in which the screw partner (i.e., a screw to which a torque is to be applied within the scope of the present invention context, for example) is hard to reach because of particular spatial installation conditions. Geared offset heads are usually gear units which are accommodated in a flat housing and which have a drive which is usually provided at one end and an output which is provided at the opposite end and at which the screw partner can be attached, preferably in a detachable manner. The gear in the geared offset head housing is often composed of an assembly of gearwheels which mesh with one another and therefore realize a torque transmission from the drive to the output, the assembly of gearwheels realizing a 1:1 transmission, for example, between the drive and the output (which are themselves often realized as gearwheels which have a corresponding external tooth system); however, different variations and modifications of said common and generic technology are available and known depending on the field of application.

On the side of the output, geared offset heads have an output gearwheel which is supported by at least one adjacent gearwheel and which can mesh with the adjacent gearwheel. The output gearwheel is used to transmit the torque to the screw partner. In this regard, a distinction is to be made between geared offset heads of a closed design, in which the screw partner can be inserted into the output gearwheel in the axial direction only, the output gearwheel being provided with a hexagon socket, for example, and geared offset heads of an open design, in which the screw partner can additionally engage with the output gearwheel in the radial direction in relation to the axis of rotation of the output gearwheel.

The output gearwheel of the open design is not closed, but has a recess at its circumference in order to be able to receive the screw partner in the hexagon socket in the radial direction. To provide adequate support for the output gearwheel in each phase of its rotation, the output gearwheel temporarily meshes with at least two adjacent gearwheels or support gearwheels, the output gearwheel thus being driven by at least one of the two support gearwheels. During a full rotation of 360°, the output gearwheel thus passes through at least one full support phase in which the output gearwheel engages with at least two additional gearwheels or support gearwheels and through at least one partial support phase in which the output gearwheel meshes with fewer gearwheels or support gearwheels than in the full support phase. The output gearwheel usually meshes with two support gearwheels in the full support phase and with one support gearwheel in the partial support phase. In the partial support phase, the recess of the output gearwheel thus faces the support gearwheel which does not mesh with the output gearwheel at the moment.

With respect to the closed design, one adjacent gearwheel normally suffices for the support and torque transmission, the output gearwheel of the closed design thus passing through only one full support phase during a full rotation of 360°.

The screwing device described above is mostly used in combination with a drive torque generating means which can be configured to generate a torque and to interact with a screwing device. For example, the drive torque generating means can be a handheld tool or a baton or baton angle screwdriver. Such drive torque generating means are mostly used in the industrial context and are used, in particular in combination with a screwing device, to achieve a satisfying assembly under particular spatial installation conditions in which the screw partner is hard to reach.

The combination of the screwing device and the drive torque generating means can be summarized as a screwing system, wherein the two parts can be combined with one another irrespective of the specific manufacturer. For example, manufacturers of screwing devices are known who do not sell drive torque generating means and vice versa.

Screwing systems which have a drive torque generating means and, in particular, the drive torque generating means comprise a drive motor and a controller or a control unit for the drive motor, if required. Said control unit determines, for example, whether the tool is operated either in torque control or in (rotational) speed control. In speed control, for example, a rotational speed to be maintained is defined and a switch-off torque is determined. The controller then readjusts the torque outputted by the drive motor accordingly. However, such a context ignores inaccuracies, sluggishness and efficiency losses of a driven screwing device. While an overall efficiency is known, the effect of the screwing device on the overall efficiency is unknown.

The meshing of the at least one adjacent support gearwheel has the effect that a working error, a run-out, a gearing error (e.g. damage to a tooth flank), lubrication, a surface finish and/or a state of friction between contacting tooth flanks have a negative impact on the efficiency of the screwing device and therefore the screwing system, irrespective of whether the screwing device is of the open or closed design. The greater said influences are, the more varying is the efficiency. Varying means that an efficiency curve shows significant spikes compared to a harmonic efficiency curve.

Additionally, a measureable sluggishness of the geared offset head results from the phases of a varying number of meshed support gearwheels due to the design of an open geared offset head. This leads to strong fluctuations in the operating behavior of the motor of the drive torque generating means because the motor tries to compensate for the occurring sluggishness. When operated in speed control (a speed is defined, the motor readjusts the torque), the motor tries to meet the speed requirement by changing the outputted torque, for example. An effect of this uneven and inharmonic torque curve is a poor efficiency of the screwing system for the partial support phases compared to the efficiency of the full support phases. In summary, a poorer efficiency results when the design of the open geared offset head is compared with the design of the closed geared offset head.

Additionally, the strong torque variation during a rotation of the output gearwheel has the effect that, if a switch-off torque is defined, the outputted torque of the motor can pass the switch-off torque and the motor can thus switch off. However, the switching off can be caused by the aforementioned influences of the geared offset head which deteriorate the efficiency and not, as desired, by a tightened screw partner. So it may happen that a screw connection is not even tightened until a desired tightening torque is reached because the motor switches off early. At worst, a user assumes that a screw partner is tightened in the desired manner, which could lead to damage and/or significant safety risks caused by a sudden disengagement of the screw partner.

The unevenness in the torque curve has the effect that individual outliers in the torque curve can exceed a defined switch-off limit, as a result of which the drive motor is switched off before the desired limit torque of the screw connection is reached. In other words, in screwing devices and, in particular, open geared offset heads, the brief passing of the switch-off limit has the effect that the motor is switched off although it is unclear which tightening torque is actually transmitted to the screw partner, which results in a screw connection which is tightened in an undefined manner.

Thus, there is a particular technical need for a solution to the common problem for each of the three aspects (screwing device, drive torque generating means and screwing system).

SUMMARY OF THE INVENTION

The problem which all three aspects (screwing device, drive torque generating means and screwing system) have can be seen in the fact that influences deteriorating the efficiency have a direct impact on a motor behavior and a constant operating behavior and a defined tightening of the screw partner is thus hampered or impossible. In particular when open geared offset heads are used, the brief passing of the switch-off torque by the outputted torque caused by the partial support phase can lead to the early switching off of the motor and therefore to a screw connection which is tightened in an undefined manner or which is incomplete.

However, the establishment of a high-quality screw connection is often required for reasons of quality assurance especially in the industrial context.

Therefore, the object of the present invention is to propose a screwing device, a drive torque generating means, a screwing system, a method and a use which ensure a high-quality screw connection, in particular with respect to the design of the screwing device. Furthermore, a screw connection is to be realized in such a manner that it can be tightened until a defined limit torque is reached.

Said object is attained by the screwing device having the features disclosed herein, by the drive torque generating means having the features disclosed herein, by the screwing system having the features disclosed herein, by the method for controlling the drive motor having the features disclosed herein and by the use having the features disclosed herein.

The invention is based on the realization that the described influences deteriorating the efficiency and/or the sluggishness with respect to the full 360° rotation of the output gearwheel occur in a cyclic manner. Significant influences during the partial support phase occur especially in a geared offset head of the open design. Thus, it has become clear which degree of efficiency is available in which angle position of the output gearwheel and which influences have a deteriorating effect. In order to ensure a constant operating behavior and/or to avoid the switching off of the drive motor by an early reaching of a defined limit value, such as the switch-off torque, a manipulation or a compensation of a value of the actual output torque outputted by the drive motor is provided. To this end, compensation data are used which can comprise a torque curve and/or an efficiency curve which are shaped in a full 360° rotation of the output gearwheel and/or its passage through the full support phase or the partial support phase, for example. The information on the torque behavior or the efficiency of the screwing device can thus be used.

A compensation file or the torque curve specific to the output gearwheel or, more precisely, its value can be realized by an initial measurement of the screwing device on a suitable test stand, for example. Having information on the time and/or the rotation angle of the sluggishness, the value of the actual output torque can be manipulated or a peak in the detected actual output torque potentially exceeding the value of the output torque can be compensated. Now that the time and/or the rotation angle at which sluggishness occurs is known, the torque peak caused by the output gearwheel and/or its part in the torque peak can be subtracted from the value of the actual output torque outputted by the drive motor.

For example, the torque curve specific to the output gearwheel can comprise data or values relating to a full 360° rotation of the output gearwheel or at least to an angle range or a partial support phase.

Several advantages are therefore available. Firstly, the efficiency can be significantly improved. Additionally, a comparison with the at least one compensation file shows whether the torque peak is caused by the output gearwheel or by the screw connection. If the value of the compensated torque exceeds a limit value, such as the switch-off torque, it is assumed that a tight screw connection is provided. This is because the invention solely compensates for the torque increase caused by the output gearwheel; if the limit value is reached because of the screw connection, the motor can be switched off in the known way.

This idea according to the invention is embodied in the screwing device, in the drive torque generating means, and in the screwing system as disclosed herein, and is realized by the method and the use disclosed herein.

In order to solve the abovementioned problems, a screwing device for applying and/or transmitting a torque to a screw partner and for interacting with a drive torque generating means is proposed, the screwing device comprising geared offset head means having an output which can be connected to the screw partner in a detachable manner and a drive to which a drive torque can be manually or mechanically applied, an output gearwheel which can be driven by the geared offset head means, a mechanical interface for selective direct or indirect connection to the drive torque generating means for introducing the torque, a compensation unit configured to store and process compensation data which comprise a torque curve specific to the output gearwheel and/or an efficiency curve specific to the output gearwheel for offsetting said data against a value of an actual output torque in order to generate a value of a compensated output torque, and a data interface configured to transmit compensation data to a drive torque generating means.

For example, the screwing device can have an open design. During a full rotation, the output gearwheel of this design passes through at least one full support phase in which it meshes with at least two other gearwheels and through at least one partial support phase in which it meshes with fewer gearwheels than in the full support phase. However, the screwing device can also have a closed design. Furthermore, the screwing device can be an angle head. An angle head can be disposed between a drive torque generating means and a geared offset head in order to transmit a torque by means of a force deflection gear. The invention can therefore be implemented in an angle head, wherein, in an angle head, the geared offset head means can also be referred to as gearwheels or cone gearwheels for transmitting a torque and the output gearwheel can be referred to as the gearwheel which transmits the torque from the angle head to a geared offset head, for example.

The screwing device can be connected to various suitable drive torque generating means in the known way and has at least one compensation file stored on it in order to provide it to the drive torque generating means by means of the data interface. "Offsetting" as used according to the invention does not directly refer to the use of basic arithmetic operations, but rather to a computerized processing.

In a preferred embodiment of the screwing device according to the invention, at least one torque detection means for detecting the value of the actual output torque is provided. Usually, screwing devices and, in particular, geared offset heads do not comprise their own torque detection means. The torque detection means of the screwing device can be a torque sensor. Since screwing devices are used in combination with a drive torque generating means in order to establish a screw connection and the drive torque generating means usually comprises its own torque detection means, a torque detection means can be dispensed with in a screwing device, in principle. However, such a torque detection means provides the option of detecting the torque in the screwing device itself, said data thus providing precise information on the actual torque available at the output gearwheel or at least a clear indication thereof.

Additionally, a drive torque generating means for generating a torque and for interacting with a screwing device is proposed according to the invention, the drive torque generating means comprising a drive motor, a mechanical interface for selective direct or indirect connection to the screwing device for introducing the torque, a torque detection means for detecting a value of the actual output torque, and a compensation unit configured to store and process compensation data comprising a torque curve specific to the output gearwheel and/or an efficiency curve specific to the output gearwheel for offsetting said data against the value of an actual output torque in order to generate a value of a compensated output torque.

The idea according to the invention can also be implemented in a drive torque generating means. By detecting the torque by means of the torque detection means, the position of the output gearwheel can be detected at any time by means of a comparison with the compensation data. A compensation according to the invention can thus be realized at least in the partial support phase. For example, the torque detection means can be a torque sensor or a motor encoder.

The drive torque generating means can be connected to various suitable screwing devices in the known way and can store compensation data of the connected screwing device. A data interface is not absolutely necessary.

In another preferred embodiment of the drive torque generating means according to the invention, a data interface is provided which is configured to transmit compensation data. For example, data can thus be exchanged between the drive torque generating means and a screwing device connected thereto. It is conceivable, for example, that a single drive torque generating means can execute compensations according to the invention for each torque of different screwing devices connectable to the drive torque generating means in the manner according to the invention. One drive torque generating means can thus be used for different screwing devices. The data can be transmitted in a wireless or wired manner, for example.

Alternatively or additionally, a screwing device identification means may be provided. Such a means is an appropriate instrument for the unique identification of the screwing device connected to the drive torque generating means. For example, the identification can take place via manual input to the drive torque generating means or automatically when a screwing device is connected. Preferably, the screwing device can transmit its own identification to the drive torque generating means by means of the data interface. Each identification can be assigned a specific compensation file which can be retrieved and applied when the identification is detected. For example, the compensation unit can store a plurality of output gearwheel-specific torque curves or efficiency curves in order to interact with the corresponding different screwing devices in the manner according to the invention.

According to another preferred embodiment of the invention, the screwing device or the drive torque generating means has an angle determination means for determining a position angle of the output gearwheel. Such an angle determination means allows for a precise detection of the position of the output gearwheel or of its position angle in a 360° system, for example, and therefore for a determination of the phase in which the output gearwheel is. Additionally, the identification of the screwing device and, in particular, of its transmission ratio can be advantageous in such a case. Furthermore, a zero position (0°) or an angular distance does not have to be initially indicated because it can be determined.

Furthermore, a screwing system is proposed, the screwing system at least comprising a screwing device comprising geared offset head means having an output which can be connected to the screw partner in a detachable manner and a drive to which a drive torque can be manually or mechanically applied, an output gearwheel which can be driven by the geared offset head means, a mechanical interface for selective direct or indirect connection to the torque generating means for introducing the torque, and a drive torque generating means connected to the geared offset head means on the side of the drive and comprising a drive motor, a mechanical interface for selective direct or indirect connection to the screwing device for introducing the torque, a torque detection means for detecting a value of the actual output torque, and a compensation unit configured to store and process compensation data comprising a torque curve specific to the output gearwheel and/or an efficiency curve specific to the output gearwheel for offsetting said data against the value of the actual output torque in order to generate a value of a compensated output torque.

The screwing system can be designed as a handheld screwing system, in which case it has a weight which preferably enables an operator to hold it with one hand. The screwing system consequently conforms to legal requirements in terms of weight. Alternatively, it can be realized as a stationary system.

According to a preferred embodiment of the screwing system according to the invention, the screwing system comprises at least one data interface configured to transmit compensation data. By means of such a data interface, data can be transmitted either between the screwing device and the drive torque generating means or between the screwing system and an external data storage. This is because maintenance work may be performed at the compensation data or compensation data may be adapted.

According to another preferred embodiment of the screwing system according to the invention, said screwing system comprises an angle determination means for determining a position angle of the output gearwheel.

According to the invention, a method for controlling a drive motor of a screwing system, preferably of a screwing system according to claim 7, is proposed, the method comprising at least the following steps:

- storing a torque curve specific to the output gearwheel and/or an efficiency curve specific to an output gearwheel in a compensation unit,
- detecting a value of the actual output torque outputted by the drive motor by means of a torque detection means
- offsetting the value of the actual output torque against at least one compensation file in order to generate a value of a compensated output torque, and
- outputting the value of the compensated output torque to a control unit of the drive motor by the compensation unit.

The method therefore realizes the idea of the invention. The torque curve specific to the output gearwheel and the efficiency curve specific to the output gearwheel are compensation data. The method according to the invention has essentially the abovementioned advantages, to which reference is hereby made.

In a preferred embodiment of the method according to the invention, the offsetting comprises a comparison and/or a subtraction and/or an addition of a compensation file and the value of the actual output torque, preferably exclusively for at least one partial support phase and/or a smoothing of the value of the actual output torque, preferably exclusively for at least one partial support phase. The torque increase caused by the screwing device can thus be manipulated in such a manner that it is deemed not to be present. The control unit, which can be configured for control and/or adjustment processes, for example, receives the outputted value of the compensated output torque, processes it and processes it in the known way depending on the operating mode (speed control or torque control).

According to a preferred embodiment of the method according to the invention, the method comprises the following steps:

- determining the position angle of the output gearwheel by means of an angle determination means, and
- using the position angle in order to generate the value of the compensated output torque by the compensation unit.

In such an embodiment, the position angle of the output gearwheel can be used for more precise compensation. In an open screwing device, for example, said angle can be used to determine in which rotation phases the output gearwheel is in the full support phase or in the partial support phase. The position angle can be indicated in a 360° system. With respect to an output gearwheel supported by two support gearwheels, a first partial support phase can usually be in a first angle range between approximately the $130^{th}$ position angle and the $170^{th}$ position angle and a second support phase can be in a first angle range between approximately the $190^{th}$ position angle and the $230^{th}$ position angle. However, the angle ranges depend on the specific design of the support gearwheels and their disposition. In a zero position or at a position angle of 0° of the output gearwheel, an open screwing device provides an attachment position in which the output gearwheel can be attached to a screw partner.

According to another preferred embodiment of the method according to the invention, the method comprises the following steps:

- defining a switch-off torque value, the drive motor being switched off when the value of the compensated output torque of the drive motor reaches the defined switch-off torque value, and
- defining a target speed at which the drive motor rotates, the target speed being dynamically adjustable in such a manner that it is as high as possible until the switch-off torque value is reached.

During operation, the level of the target speed can ideally be selected in such a manner that the target speed is just short of exceeding the switch-off torque value. Such an embodiment leads to a quick screwing process.

It is also conceivable that the method according to the invention provides an operation of the screwing system in speed control. Such an operating mode is especially common in the industrial context and allows for the advantageous use of the invention in said context.

According to another preferred embodiment of the invention, the method provides the following steps:

- combining several partial support phases within a full rotation of the output gearwheel in a partial support phase group, and
- offsetting the value of the actual output torque against at least one compensation file in order to generate a value of a compensated output torque at least for the partial support phase group.

If the output gearwheel passes through several partial support phases during a full rotation of 360°, several, preferably all, of these partial support phases can be combined in a partial support phase group. The advantage is that only one compensation per rotation has to be executed, namely for the part of the partial support phase group which extends from the first partial support phase of the group to the last partial support phase.

If there are two partial support phases, for example, (such as a first partial support phase in a first angle range between approximately the $130^{th}$ position angle and the $170^{th}$ position angle and a second partial support phase in a first angle range between approximately the $190^{th}$ position angle and the $230^{th}$ position angle), a partial support phase group can be formed thereof, the partial support phase group extending from the $130^{th}$ position angle to the $230^{th}$ position angle. A single compensation would thus be executed for said angle range.

Furthermore, a use of a screwing system according to claim 7 for performing the method according to claim 10 is proposed. The use according to the invention has essentially the abovementioned advantages, to which reference is hereby made.

In order to avoid repetitions, disclosed features relating to the device are also seen as relating to the method and are thus also claimable therefor. In the same manner, disclosed features relating to the method are also seen as relating to the device and are thus also claimable therefor.

All combinations of at least two features disclosed in the description, the claims and/or the figures constitute part of the scope of the invention. A combination of said features is also seen as claimable.

BRIEF DESCRIPTION OF THE DRAWINGS

Further advantages, features and details of the invention are apparent from the following description of a preferred exemplary embodiment and from the drawings.

In the drawings.

DETAILED DESCRIPTION

Figure 1:
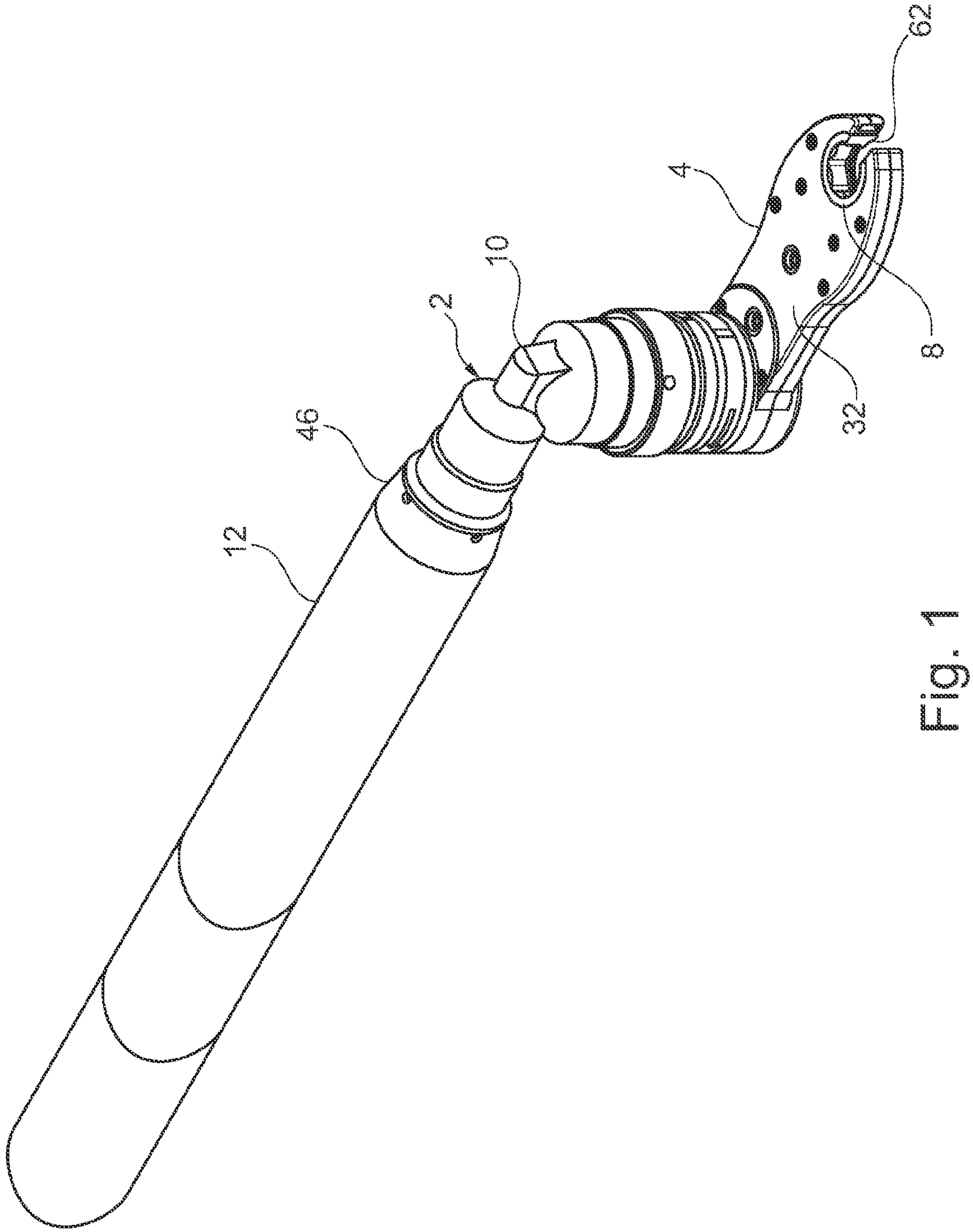
FIG. 1 shows a perspective view of the handheld screwing system according to the invention.

FIG. 1, the system view and, at the same time, context view for the present invention, shows a perspective view of a handheld screwing system having a screwing device 2 for applying a torque to a screw partner (not shown), screwing device 2 comprising geared offset head means 6 accommodated in a housing 4 of an open geared offset head 32. At one end (on the side of the output), geared offset head means 6 are configured to interact with and to drive a fitting screwing tool realized as a slotted output gearwheel 8. On the side of the drive, i.e., at the end of geared offset head means 6 opposite to the output, geared offset head means 6 are connected to a manually actuatable drive torque generating means via an angle head 10 having a pair of gearwheels or cone gearwheels, if applicable, via a mechanical interface 46, the drive torque generating means being realized as a screwing tool 12.

Screwing tool 12 has a drive motor 26 (e.g. electric or pneumatic) and applies its generated output torque to screwing device 2. Both screwing device 2 and screwing tool 12 each have a mechanical interface for selective direct or indirect connection to the other of the two partners of the screwing system.

In a typical realization for the manual screwing actuation, such screwing devices 2 or geared offset head means 6 are provided and suitable for the transmission of a maximum torque of approx. 250 Nm.

Screwing device 2 is designed as an open geared offset head and is characterized in that output gearwheel 8 has a recess 62 realized as a slot for the radial reception of a screw partner in a hexagon socket. Alternatively, the screwing device shown in the figures can be designed as a closed geared offset head. Both designs have identical influences indicated above which deteriorate the efficiency and whose effects are excluded for both designs by means of the invention. Additionally, the open design has the impact on the efficiency during the partial support phase, the effects of which can also be excluded according to the invention.

Figure 2:
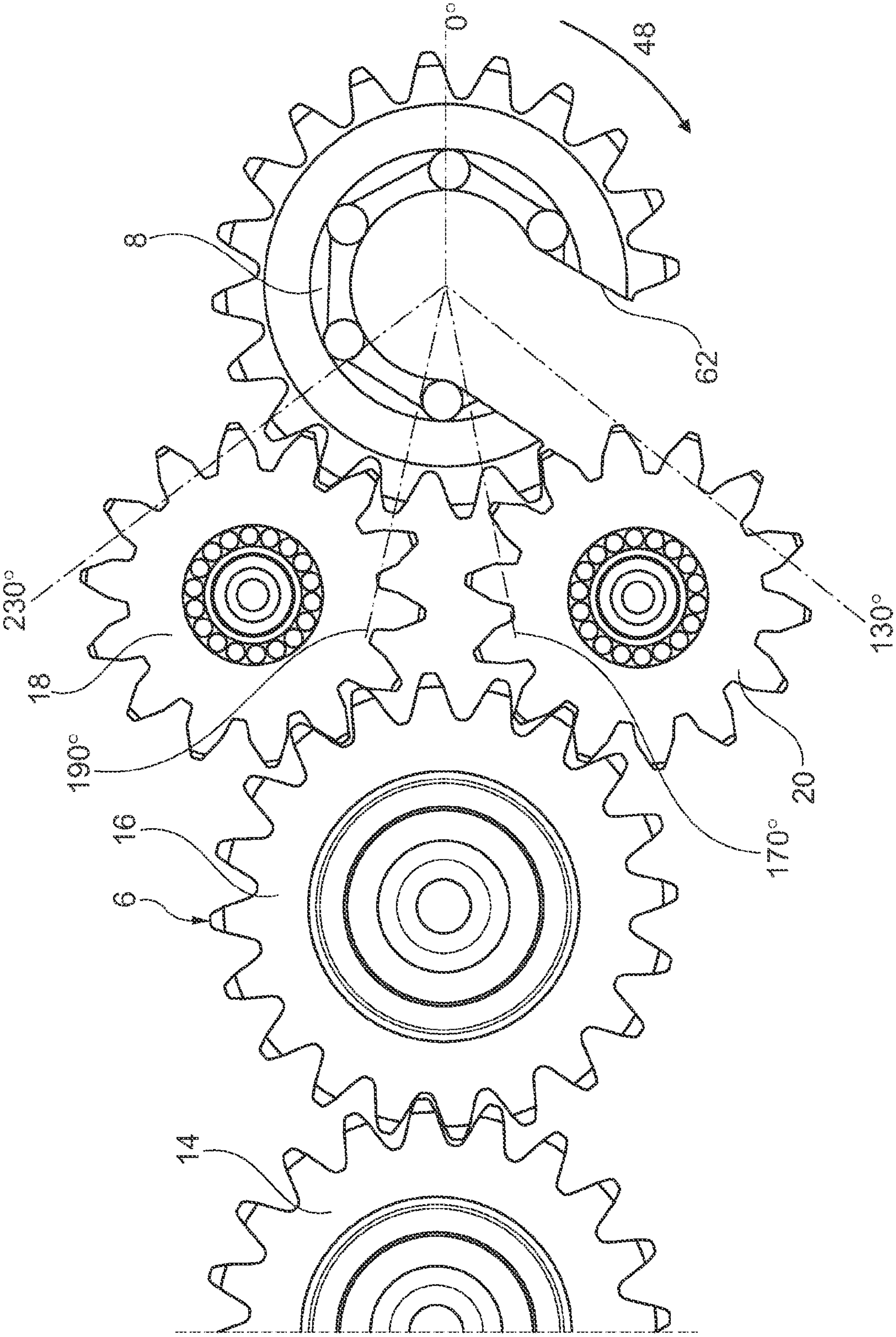
FIG. 2 shows a schematic top view of the geared offset head means according to the invention (with the housing removed)

FIG. 2 shows several geared offset head means 6 or gearwheels of screwing device 2 in a top view with housing 4 being removed and an output gearwheel 8 on the side of the output. The output torque outputted by drive motor 26 is applied to a first idler gearwheel 14, a second idler gearwheel 16 and a first support gearwheel 18 and a second support gearwheel 20. The two support gearwheels 18 and 20 transmit the torque to output gearwheel 8 by meshing accordingly.

Gearwheels 8, 14, 16, 18 and 20 are mounted axially parallel to one another and are disposed in a linear manner along a length of housing 4 so as to be rotatable in housing 4. An arrow indicates a tightening rotation direction 48 of output gearwheel 8.

During a full rotation of 360°, output gearwheel 8 passes through two full support phases and two partial support phases. In the full support phases, output gearwheel 8 engages with the two support gearwheels 18 and 20. In the partial support phases, output gearwheel 8 engages with only one of the two support gearwheels 18, 20. In terms of angle positions—0° pointing to an attachment position in the longitudinal direction of housing 4 and being referred to as zero position in which output gearwheel 8 can be attached to a screw partner—this means that a first full support phase starts at an angle position of 230°, passes an angle position of 0° and extends up to an angle position of 130°. The first partial support phase starts at an angle position of 130° and extends up to an angle position of 170°. Said first partial support phase is followed by a narrow second full support phase between an angle position of 170° and 190°. Finally, output gearwheel 8 passes through a second partial support phase between an angle position of 190° and 230°. The full support phases and the partial support phases thus alternate.

Figure 5:
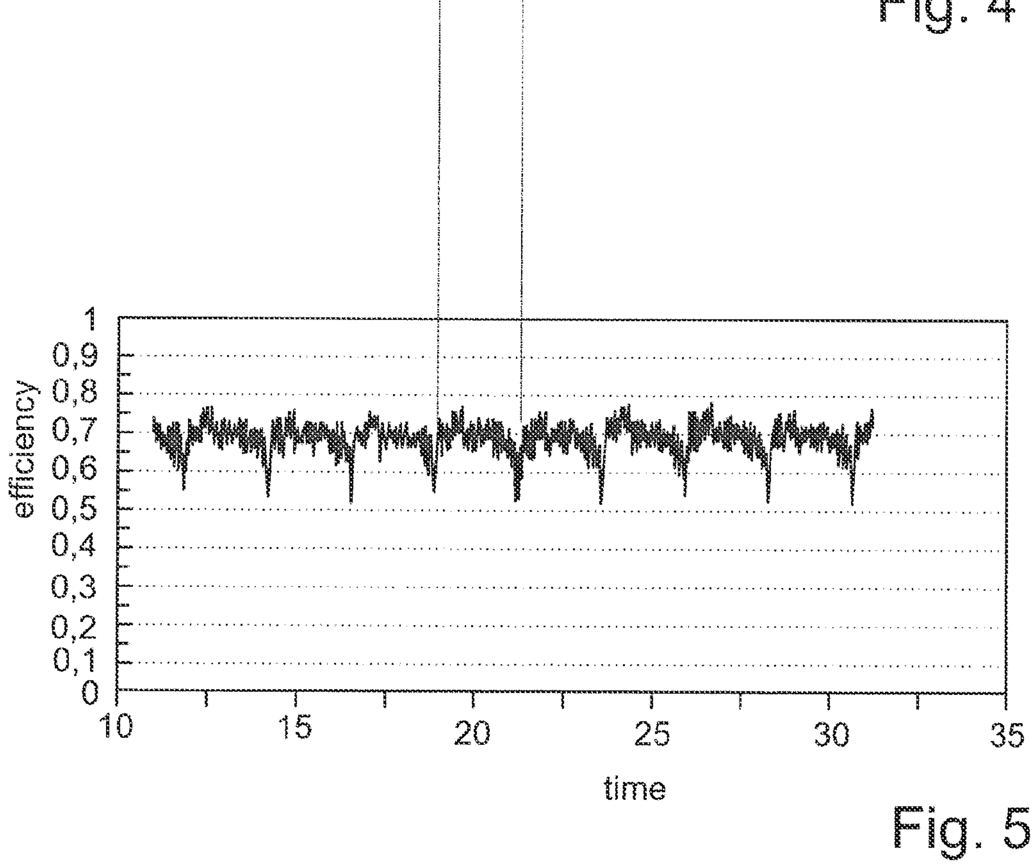
FIG. 5 shows a protocol of an efficiency curve of the open geared offset head according to FIG. 4.

During each of the two partial support phases, sluggishness occurs and leads to deteriorated efficiency, as shown in FIG. 5. Sluggishness can also occur in the narrow full support phase.

Figure 3:
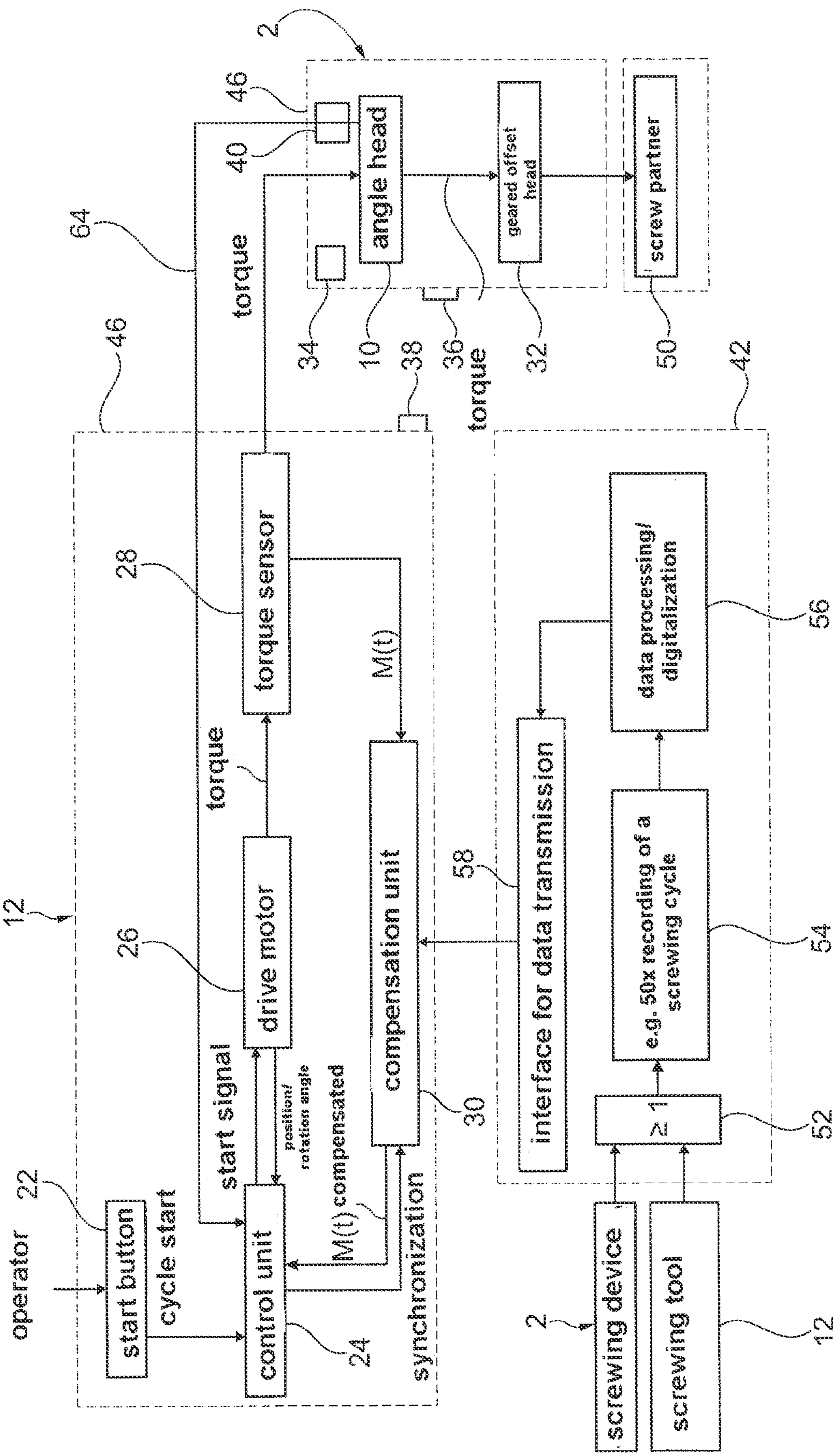
FIG. 3 shows a block diagram of components of the screwing system according to the invention.

FIG. 3 provides an overview of various means and elements of the screwing system according to the invention and adjacent systems.

Screwing tool 12 comprises a start button 22 for the operation of screwing tool 12 by an operator. An energy supply and a control unit 24 are activated by means of start button 22. When the screwing system is operated in speed control, a speed is defined and control unit 24 readjusts, inter alia, a torque outputted by a drive motor 26 by means of signals outputted to drive motor 26. To this end, drive motor 26 can comprise a planetary gear (not shown), for example. Drive motor 26 can transmit its position and/or its rotation angle to control unit 24 by means of signals. Drive motor 26 outputs an actual output torque which is detected as a value by a torque sensor 28 which is used as a torque detection means.

A control loop for controlling the drive motor of the screwing system starts at this point. In fact, torque sensor 28 transmits the detected actual output torque or its value outputted by drive motor 26 to a compensation unit 30. A torque curve specific to the output gearwheel or an efficiency curve specific to the output gearwheel is stored in compensation unit 30. Among other things, compensation unit 30 is configured to offset the value of the actual output torque against the torque curve specific to the output gearwheel in order to generate a value of a compensated output torque. In other words, the sluggishness which is caused by the output gearwheel and which is reflected as a peak in the value of the actually outputted output torque is removed or compensated. Compensation unit 30 then transmits the value of the compensated output torque to control unit 24. Control unit 24 is configured to compare the value of the compensated output torque with a switch-off torque, drive motor 26 being switched off when the value of the compensated output torque reaches the switch-off torque.

By switching off drive motor 26 when the switch-off torque is reached, the invention shows and ensures that a screwing process has been executed to a successful end, i.e., until a fixed or defined screw connection has been established. An early switching off caused by the sluggishness of screwing device 2 and the increase of the torque caused thereby to above the switch-off torque, as the case may be, is now excluded.

In addition, control unit 24 processes the value of the compensated output torque in the same known way as a value of an actual output torque in a known control loop of a motor control.

The torque outputted by drive motor 26 is outputted to screwing device 2 via the mechanical interface. In the embodiment shown in FIG. 3, screwing device 2 comprises angle head 10 and a geared offset head 32 which comprises geared offset head means 6 and output gearwheel 8. The torque is ultimately transmitted from output gearwheel 8 to screw partner 50 in order to establish a fixed screw connection.

The drive torque generating means or screwing device 2 can comprise a screwing device identification means 34 which can transmit an identification of, for example, the design, geared offset head means 6, geared offset head 32 and/or the transmission ratio to screwing tool 12 in a wired or wireless manner. To this end, a data interface 36 can be used to transmit compensation data, for example. Screwing device 2 can also comprise a data interface 36 in order to receive compensation data, for example, from screwing device 2 and/or to receive data from an external data source or to send said data to the external data source. For example, screwing device 2 can comprise an angle determination means 40 for determining a position angle of output gearwheel 8. Said measured value of the angle position can be transmitted by means of one or both data interfaces 36 and 38, for example. The transmission is indicated by means of an idealized data path 64 which transmits the measured value of the angle position from angle head 10 and/or angle determination means 40 to control unit 24 for further processing.

Figure 6:
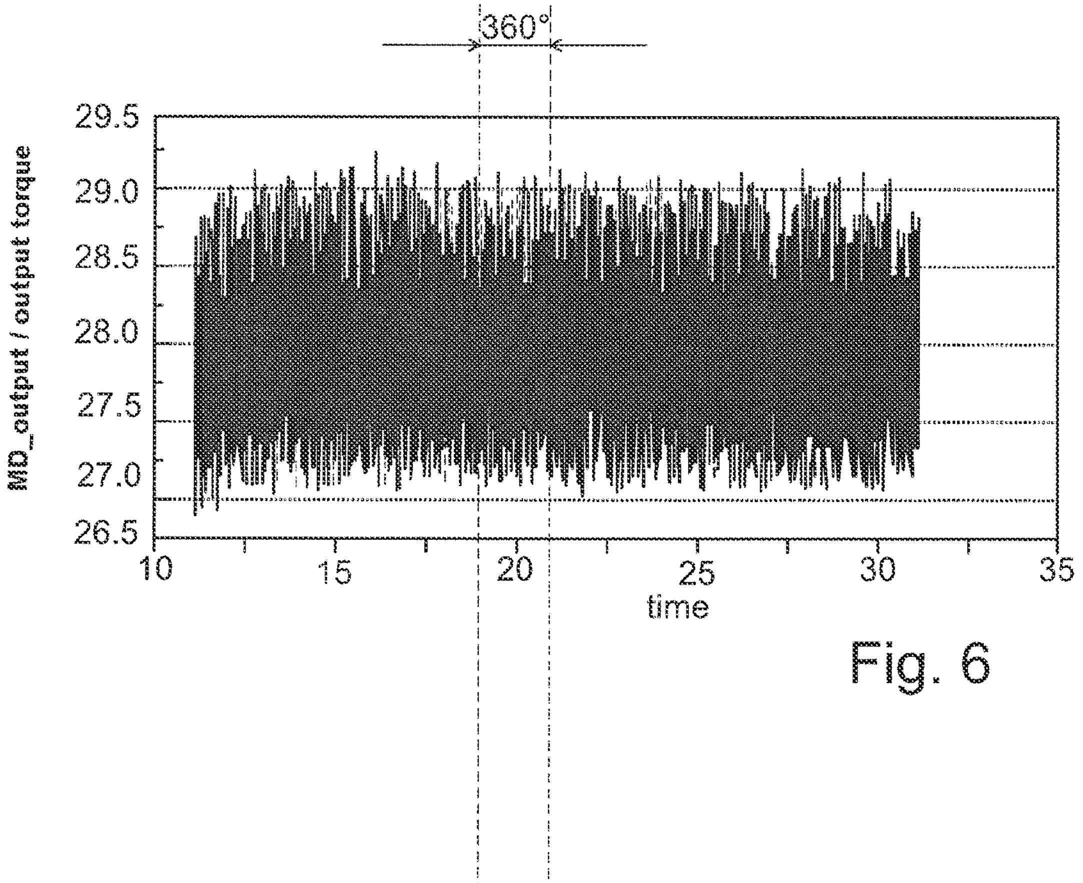
FIG. 6 shows a protocol of a torque curve of a closed geared offset head.

An example of a measurement is shown within a system limit 42. To this end, a screwing device 2 is connected in combination with a screwing tool 12 or a drive torque generating means and at least one full rotation of output gearwheel 8 is detected, as shown in block 52. In this regard, the focus is on the transmitted torque and the efficiency. For example, more than 50 full rotations or screwing cycles can preferably be recorded, as shown in block 54. FIG. 6 shows the resulting measurement signal of the torque. Said measurement signal is further processed in block 56 in a manner not described in further detail and is digitalized, if required. The measurement signal is then transmitted to compensation unit 30, for example, by means of an interface 58 for data transmission and is stored there. However, the measurement signal can also be stored in a suitable memory of screwing device 2.

Figure 4:
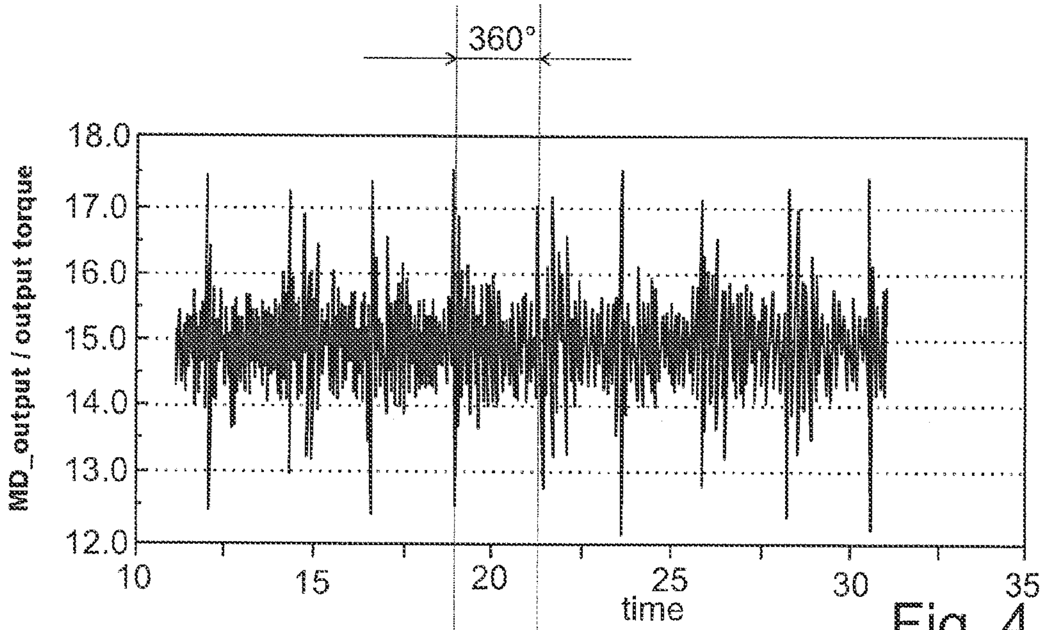
FIG. 4 shows a protocol of a torque curve of an open geared offset head.

FIG. 4 shows the measurement curve of an open geared offset head which has an output gearwheel 8 meshing with two support gearwheels 18 and 20 as detected within system limit 42. A combined view of FIGS. 4 and 5 shows the realization on which the invention is based. It was noted that the sluggishness of screwing device 2 occurs in a cyclic manner. Drive motor 26 tries to compensate for said sluggishness in speed control, for example, by increasing the outputted output torque, as shown by the peaks in FIG. 4. The result is the efficiency curve which is shown in FIG. 5 and which drops significantly every 360°. The efficiency drop coincides with the sluggishness and it can therefore be concluded that a change of the value should have the effect that a drive motor 26 does not have to react to sluggishness by increasing the outputted output torque, which ultimately leads to improved efficiency.

Figure 7:
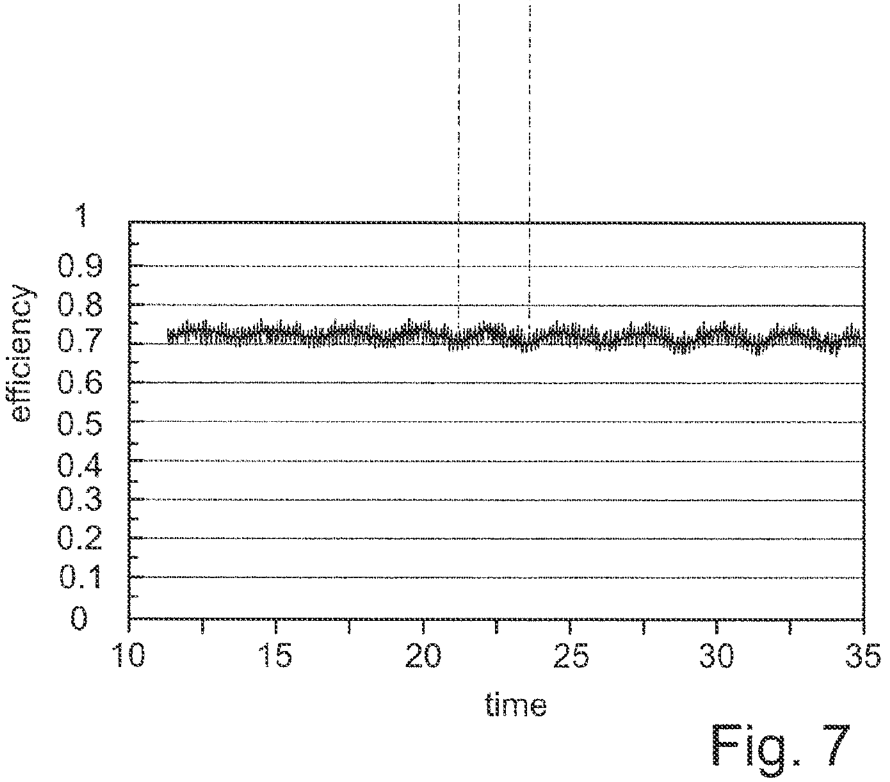
FIG. 7 shows a protocol of an efficiency curve of the closed geared offset head according to FIG. 6.

FIG. 6 shows the measurement curve of a closed geared offset head which has an output gearwheel meshing with only one support gearwheel as detected within system limit 42. FIG. 7 shows the efficiency curve resulting directly therefrom. Compared to the measurement curves of the open geared offset head shown in FIG. 5, this measurement curve shows a steadier course. An averaging of the efficiency course shows a sinusoidal wave 60 which has a cyclic behavior. In this case, the wave repeats with each rotation of the output gearwheel every 360°.

Figure 8:
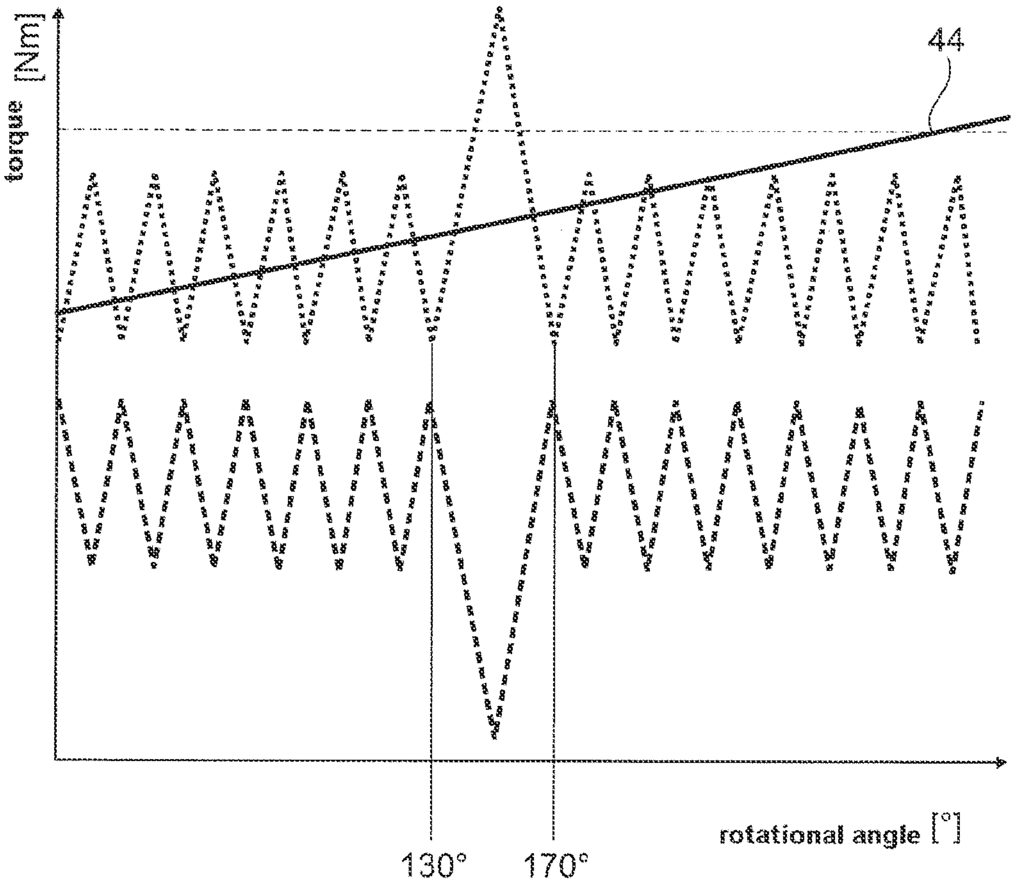
FIG. 8 shows a diagram of a compensation in a partial support phase of an open geared offset head.
Figure 9:
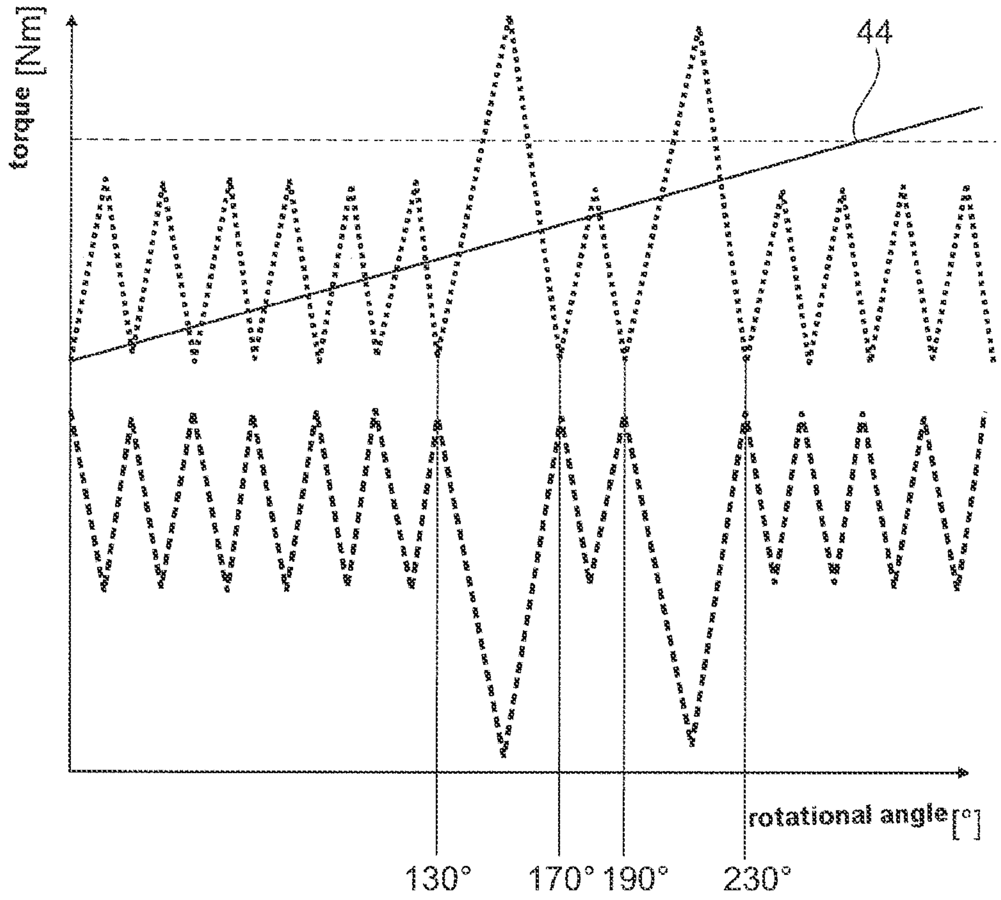
FIG. 9 shows a diagram of the compensation of a partial support phase of an open geared offset head.

FIGS. 8 and 9 show compensation examples or two options of drive motor controls. Although the following description refers solely to the geared offset head, the mentioned principles can also be used in a closed geared offset head.

In FIG. 8, a torque specified in newton meters is plotted in relation to a rotation angle specified in degrees in a schematically simplified manner. The value of a switch-off torque is shown by means of a coarse dashed line. The value of the actually outputted output torque is shown by means of a medium-fine dashed line. The value of the torque curve specific to the output gearwheel as a compensation file is shown by means of a finely dashed line. The value of the compensated output torque is shown by means of a solid line.

It can be seen that drive motor 26 tries to compensate sluggishness between an angle position of 130° and 170° of output gearwheel 8 by outputting an increased output torque–the torque peak shown in FIG. 6. Compensation unit 30 offsets the value of the actually outputted output torque against the value of the torque specific to the output gearwheel at least for this partial support phase between 130° and 170°. By comparison with the value of the torque specific to the output gearwheel, compensation unit 30 detects that a cyclic torque peak occurs in said angle range (130° to 170°)—a clear indication of a torque peak caused by the output gearwheel. The result of this offsetting is the schematically shown value of a compensated output torque. Said output torque increases regardless of the compensation according to the invention and reaches the switch-off torque at point 44. At point 44, control unit 24 causes a switching off of drive motor 26. At that time, a tight screw connection is assumed.

FIG. 9 is largely similar to FIG. 8, which is why the following description shall merely focus on the differences.

It can be seen that output gearwheel 8 has a first partial support phase between a rotation angle of 130° and 170° and a second partial support phase between a rotation angle of 190° and 230°. A full support phase in an angle range from 170° to 190° is located between the two partial support phases. The two partial support phases are flanked by another full support phase which ranges from a rotation angle of 230° through a zero position of 0° up to a rotation angle of 130°. A compensation of the two torque peaks in the partial support phases can take place separately for each partial support phase. However, it is also conceivable to combine the two partial support phases within the full rotation of output gearwheel 8 in a partial support phase group. This allows for the realization of a single compensation for the partial support phase group as a whole in the manner described above.

REFERENCE SIGNS 2 screwing device
4 housing
6 geared offset head means
8 output gearwheel
10 angle head
12 screwing tool
14 first idler gearwheel
16 second idler gearwheel
18 first support wheel
20 second support wheel
22 start button
24 control unit
26 drive motor
28 torque sensor
30 compensation unit
32 geared offset head
34 screwing device identification means
36 data interface
38 data interface
40 angle determination means
42 system limit
44 cut
46 mechanical interface
48 tightening rotation direction
50 screw partner
52 block
54 block
56 block
58 interface
60 sinusoidal wave
62 recess
64 data path

The invention claimed is:

1. A screwing device for applying and/or transmitting a torque to a screw and for interacting with a drive torque generating means, the screwing device comprising geared offset head means (6) having an output which can be connected to the screw in a detachable manner and a drive to which a drive torque can be manually or mechanically applied, an output gearwheel (8) which can be driven by the geared offset head means (6), a mechanical interface (46) for selective direct or indirect connection to the drive torque generating means for introducing the torque, a compensation unit (30) configured to store and process compensation data comprising a torque curve specific to the output gearwheel and an efficiency curve specific to the output gearwheel for offsetting said data against a value of an actual output torque in order to generate a value of a compensated output torque, and a data interface (36) configured to transmit compensation data to the drive torque generating means.

2. The screwing device according to claim 1, comprising at least one torque detection means for detecting the value of the actual output torque.

3. The screwing device according to claim 1, comprising a screwing device identification means.

4. The screwing device according to claim 1, comprising an angle determination means (40) for determining a position angle of the output gearwheel (8).

5. A drive torque generating means for generating a torque and for interacting with a screwing device, the drive torque generating means comprising a drive motor (26), a mechanical interface (46) configured for selective direct or indirect connection to the screwing device (2) for introducing the torque, a torque detection means for detecting a value of the actual output torque, and a compensation unit (30) configured to store and process compensation data comprising a torque curve specific to an output gearwheel and an efficiency curve specific to the output gearwheel for offsetting said data against the value of an actual output torque in order to generate a value of a compensated output torque, and further comprising a data interface (38) configured to transmit compensation data.

6. A screwing system at least comprising a screwing device (2) comprising geared offset head means (6) having an output which can be connected to a screw in a detachable manner and a drive to which a drive torque can be manually or mechanically applied, an output gearwheel (8) which can be driven by the geared offset head means (6), a mechanical interface (46)

for selective direct or indirect connection to the drive torque generating means for introducing the torque, and a drive torque generating means connected to the geared offset head means (6) on the side of the drive and comprising a drive motor (26), a mechanical interface (46) configured for selective direct or indirect connection to the screwing device (2) for introducing the torque, a torque detection means for detecting a value of the actual output torque, and a compensation unit (30) configured to store and process compensation data comprising a torque curve specific to the output gearwheel and an efficiency curve specific to the output gearwheel for offsetting said data against the value of the actual output torque in order to generate a value of a compensated output torque.

7. The screwing system according to claim 6, comprising at least one data interface (36, 38) configured to transmit compensation data.

8. The screwing system according to claim 6, comprising an angle determination means (40) for determining a position angle of the output gearwheel (8).

9. A method for controlling a drive motor of a screwing system according to claim 6, the method comprising at least the following steps:

storing a torque curve specific to the output gearwheel and an efficiency curve specific to an output gearwheel in a compensation unit (30), detecting a value of the actual output torque outputted by the drive motor (26) by means of a torque detection means, offsetting the value of the actual output torque against at least one compensation file in order to generate a value of a compensated output torque, and outputting the value of the compensated output torque to a control unit (24) of the drive motor by the compensation unit (30).

10. The method according to claim 9, wherein the offsetting comprises a comparison and/or a subtraction and/or an addition of a compensation file and the value of the actual output torque, and/or wherein the offsetting comprises a smoothing of the value of the actual output torque.

11. The method according to claim 10, wherein the comparison and/or the subtraction and/or the addition and/or the smoothing are exclusively for at least one partial support phase.

12. The method according to claim 9, further comprising the following steps:

determining the position angle of the output gearwheel (8) by means of an angle determination means (40), and using the position angle in order to generate the value of the compensated output torque by the compensation unit (30).

13. The method according to claim 9 further comprising the following steps:

defining a switch-off torque value, the drive motor (26) being switched off when the value of the compensated output torque of the drive motor (26) reaches the defined switch-off torque value, and defining a target speed at which the drive motor (26) rotates, the target speed being dynamically adjustable in such a manner that it is as high as possible until the switch-off torque value is reached.

14. The method according to claim 9 further comprising the following step:

operating the screwing system in speed control.

15. The method according to claim 9 further comprising the following steps:

combining several partial support phases within a full rotation of the output gearwheel (8) in a partial support phase group, and offsetting the value of the actual output torque against at least one compensation file in order to generate a value of a compensated output torque at least for the partial support phase group.

* * * * *